United States Patent
Rajamani et al.

(10) Patent No.: US 11,416,831 B2
(45) Date of Patent: Aug. 16, 2022

(54) DYNAMIC VIDEO LAYOUT IN VIDEO CONFERENCE MEETING

(71) Applicant: HUDDL Inc., Santa Clara, CA (US)

(72) Inventors: Harish Rajamani, Hyderabad (IN); Krishna Yarlagadda, Sunnyvale, CA (US); Nava Davuluri, Sunnyvale, CA (US)

(73) Assignee: HUDDL INC., Santa Clara, CA (US)

( * ) Notice: Subject to any disclaimer, the term of this patent is extended or adjusted under 35 U.S.C. 154(b) by 0 days.

(21) Appl. No.: 17/308,329

(22) Filed: May 5, 2021

(65) Prior Publication Data
US 2021/0368134 A1 Nov. 25, 2021

Related U.S. Application Data

(60) Provisional application No. 63/028,123, filed on May 21, 2020.

(51) Int. Cl.
*H04N 7/15* (2006.01)
*G06Q 10/10* (2012.01)
(Continued)

(52) U.S. Cl.
CPC ....... *G06Q 10/1097* (2013.01); *G06F 3/0484* (2013.01); *G06F 16/345* (2019.01);
(Continued)

(58) Field of Classification Search
CPC .......... H04N 7/15; H04N 7/152; H04N 7/147; G10L 25/57; G10L 15/22; G10L 15/18
(Continued)

(56) References Cited

U.S. PATENT DOCUMENTS 7,634,540 B2 12/2009 Ivashin et al.
9,113,032 B1 8/2015 Mey et al.
(Continued)

FOREIGN PATENT DOCUMENTS

WO 2019205271 A1 10/2019

OTHER PUBLICATIONS

Non-Final Office Action in U.S. Appl. No. 17/308,623 dated Jan. 20, 2022.
(Continued)

*Primary Examiner* — Melur Ramakrishnaiah
(74) *Attorney, Agent, or Firm* — Chip Law Group (57) ABSTRACT

Provided is a method and a system for updating an area allocated for display of video feed based on a determined trigger event. The method is implemented by a central server including one or more processors. The method includes initiating a video conference meeting comprising a plurality of participants. The method includes receiving network information and meeting data associated with each of the plurality of participants. The method includes selectively controlling display of video feed associated with the plurality of participants during the video conference meeting based on network information and meeting data to create an adaptive video layout for the plurality of participants. The method includes determining a trigger event to update the area allocated for display of video feed associated with the plurality of participants represented within the grid format. The method includes updating the area allocated for display of video feed based on the determined trigger event.

22 Claims, 4 Drawing Sheets

(51) Int. Cl.

| | |
|---|---|
| *G06N 20/00* | (2019.01) |
| *H04L 12/18* | (2006.01) |
| *G06F 16/954* | (2019.01) |
| *H04L 51/52* | (2022.01) |
| *G10L 15/18* | (2013.01) |
| *G10L 15/22* | (2006.01) |
| *G10L 25/57* | (2013.01) |
| *H04L 65/401* | (2022.01) |
| *H04L 65/403* | (2022.01) |
| *H04L 67/50* | (2022.01) |
| *G06F 16/34* | (2019.01) |
| *G10L 15/26* | (2006.01) |
| *G06F 3/0484* | (2022.01) |
| *H04L 65/1096* | (2022.01) |
| *H04N 21/8549* | (2011.01) |

(52) U.S. Cl.
CPC .......... *G06F 16/954* (2019.01); *G06N 20/00* (2019.01); *G06Q 10/1095* (2013.01); *G10L 15/1815* (2013.01); *G10L 15/22* (2013.01); *G10L 15/26* (2013.01); *G10L 25/57* (2013.01); *H04L 12/1818* (2013.01); *H04L 12/1831* (2013.01); *H04L 51/32* (2013.01); *H04L 65/1096* (2013.01); *H04L 65/403* (2013.01); *H04L 65/4015* (2013.01); *H04L 67/22* (2013.01); *H04N 7/15* (2013.01); *H04N 21/8549* (2013.01)

(58) Field of Classification Search
USPC .......................................... 348/14.01–14.16
See application file for complete search history.

(56) References Cited

U.S. PATENT DOCUMENTS

| | | | |
|---|---|---|---|
| 9,699,410 B1 * | 7/2017 | Nagabushanam | .... H04L 65/403 |
| 10,255,946 B1 | 4/2019 | Andrizzi et al. | |
| 10,484,189 B2 | 11/2019 | Albrecht | |
| 10,757,148 B2 | 8/2020 | Nelson et al. | |
| 10,999,346 B1 | 5/2021 | Yang | |
| 11,049,077 B1 | 6/2021 | Vukich | |
| 11,080,356 B1 | 8/2021 | Kumar et al. | |
| 11,095,468 B1 | 8/2021 | Pandey et al. | |
| 11,184,560 B1 | 11/2021 | Mese et al. | |
| 2004/0263610 A1 | 12/2004 | Whynot et al. | |
| 2009/0210933 A1 | 8/2009 | Shear et al. | |
| 2009/0222741 A1 | 9/2009 | Shaw et al. | |
| 2011/0072362 A1 | 3/2011 | Denner et al. | |
| 2011/0249073 A1 | 10/2011 | Cranfill et al. | |
| 2012/0066596 A1 | 3/2012 | Feng et al. | |
| 2012/0144320 A1 | 6/2012 | Mishra et al. | |
| 2013/0027502 A1 | 1/2013 | Skramstad | |
| 2013/0191299 A1 | 7/2013 | Hermsdorff et al. | |
| 2013/0282820 A1 | 10/2013 | Jabri et al. | |
| 2013/0325972 A1 | 12/2013 | Boston et al. | |
| 2014/0006955 A1 | 1/2014 | Greenzeiger et al. | |
| 2014/0098180 A1 * | 4/2014 | Periyannan | ............ H04N 7/152 348/14.09 |
| 2015/0142800 A1 | 5/2015 | Thapliyal | |
| 2016/0117624 A1 | 4/2016 | Flores et al. | |
| 2018/0077092 A1 | 3/2018 | Jalil | |
| 2018/0101760 A1 * | 4/2018 | Nelson | .................. G06Q 10/10 |
| 2018/0101824 A1 | 4/2018 | Nelson et al. | |
| 2018/0131904 A1 | 5/2018 | Segal | |
| 2018/0241968 A1 * | 8/2018 | Chen | ................. H04N 21/4858 |
| 2018/0270452 A1 * | 9/2018 | Moon | .................. H04L 65/602 |
| 2018/0299864 A1 | 10/2018 | Byers et al. | |
| 2018/0331842 A1 | 11/2018 | Faulkner et al. | |
| 2019/0007649 A1 * | 1/2019 | Van Rensburg | ......... H04N 7/15 |
| 2019/0052590 A1 * | 2/2019 | Katis | ...................... H04L 67/24 |
| 2019/0273627 A1 | 9/2019 | Whalin et al. | |
| 2019/0312917 A1 | 10/2019 | Choi et al. | |
| 2020/0106735 A1 | 4/2020 | Guerrier et al. | |
| 2020/0341625 A1 | 10/2020 | Roedel et al. | |
| 2020/0374146 A1 | 11/2020 | Chhabra et al. | |
| 2020/0403817 A1 | 12/2020 | Daredia et al. | |
| 2021/0201935 A1 * | 7/2021 | Seethaler | ............... H04N 7/147 |
| 2021/0226808 A1 | 7/2021 | Zarakas et al. | |
| 2021/0233036 A1 | 7/2021 | Zarakas et al. | |
| 2021/0243696 A1 | 8/2021 | Sanaullah et al. | |
| 2021/0264377 A1 | 8/2021 | Ebner et al. | |
| 2021/0306173 A1 | 9/2021 | Krikunov et al. | |
| 2021/0344612 A1 | 11/2021 | Files et al. | |
| 2021/0352120 A1 | 11/2021 | Masi et al. | |

OTHER PUBLICATIONS

Non-Final Office Action in U.S. Appl. No. 17/308,887 dated Dec. 22, 2021.
Non-Final Office Action in U.S. Appl. No. 17/308,916 dated Dec. 17, 2021.
Non-Final Office Action in U.S. Appl. No. 17/308,264 dated Oct. 28, 2021.
Final Office Action for U.S. Appl. No. 17/308,916 dated May 5, 2022.
Final Office Action in U.S. Appl. No. 17/308,887 dated May 2, 2022.
Non-Final Office Action in U.S. Appl. No. 17/308,640 dated Mar. 15, 2022.

* cited by examiner

FIG. 4 Example Computer System

DYNAMIC VIDEO LAYOUT IN VIDEO CONFERENCE MEETING

CROSS-REFERENCE TO RELATED APPLICATIONS/INCORPORATION BY REFERENCE

This application makes reference to, claims priority to, and claims benefit from U.S. Provisional Application Ser. No. 63/028,123, which was filed on May 21, 2020.

The above referenced application is hereby incorporated herein by reference in its entirety.

TECHNICAL FIELD

The presently disclosed embodiments are related, in general, to a video conferencing system. More particularly, the presently disclosed embodiments are related to a method and a system for creating an adaptive video layout to be displayed to a plurality of participants during an online meeting.

BACKGROUND

Video conferencing systems may allow for simultaneous exchange of audio, video and data among a plurality of electronic devices associated with a plurality of participants in an online meeting. The conference signals may include audio, video, data and control information. In a switched conference, the video signal from one of the electronic devices, typically that of the loudest speaker, may be broadcasted to each of the plurality of participants. In a continuous presence conference, video signals from the plurality of electronic devices may be spatially mixed to form a composite video signal for viewing by the plurality of participants. The continuous presence or composite image may be a combined picture that may include live video streams, still images, menus or other visual images from the plurality of participants in the conference.

Conventionally, in a typical continuous presence conference, the video display may be divided into a composite layout having areas or regions (e.g., quadrants). Each of the areas may display video feed associated with the plurality of participants in the conference. Common composite layouts may include four, nine or sixteen regions. The layout may be user selected and then fixed for the duration of the conference.

A few state of the art conference systems provide different composite signals or video streams mixed such that each electronic device may view a different set of video streams. Another arrangement may utilize voice activated quadrant selection to associate video streams of participants with particular quadrants. Such an arrangement may enable conference participants to view fixed video streams. However, the layout in terms of number of regions or quadrants is fixed for the conference.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for creating an adaptive video layout to be displayed to a plurality of participants during an online meeting is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The illustrated embodiments provide a method and a system for updating an area allocated for display of video feed associated with each of a plurality of participants based on determined trigger events. The method may be implemented by a central server including one or more processors. The method may include initiating a video conference meeting comprising a plurality of participants. The method may include receiving network information and meeting data associated with each of the plurality of participants. The method may include selectively controlling display of video feed associated with each of the plurality of participants during the video conference meeting based on the network information and the meeting data to create an adaptive video layout for each of the plurality of participants. In an exemplary embodiment, the adaptive video layout may be represented in a grid format. In an exemplary embodiment, an area may be allocated for display of video feed associated with each of the plurality of participants represented within the grid format. The method may include determining a trigger event to update the area allocated for display of video feed associated with each of the plurality of participants represented within the grid format. In an exemplary embodiment, the trigger event comprises a speaking activity of the plurality of participants during the video conference meeting and lexical usage corresponding to the speaking activity. The method may include updating the area allocated for display of video feed based on the determined trigger event.

Figure 1:
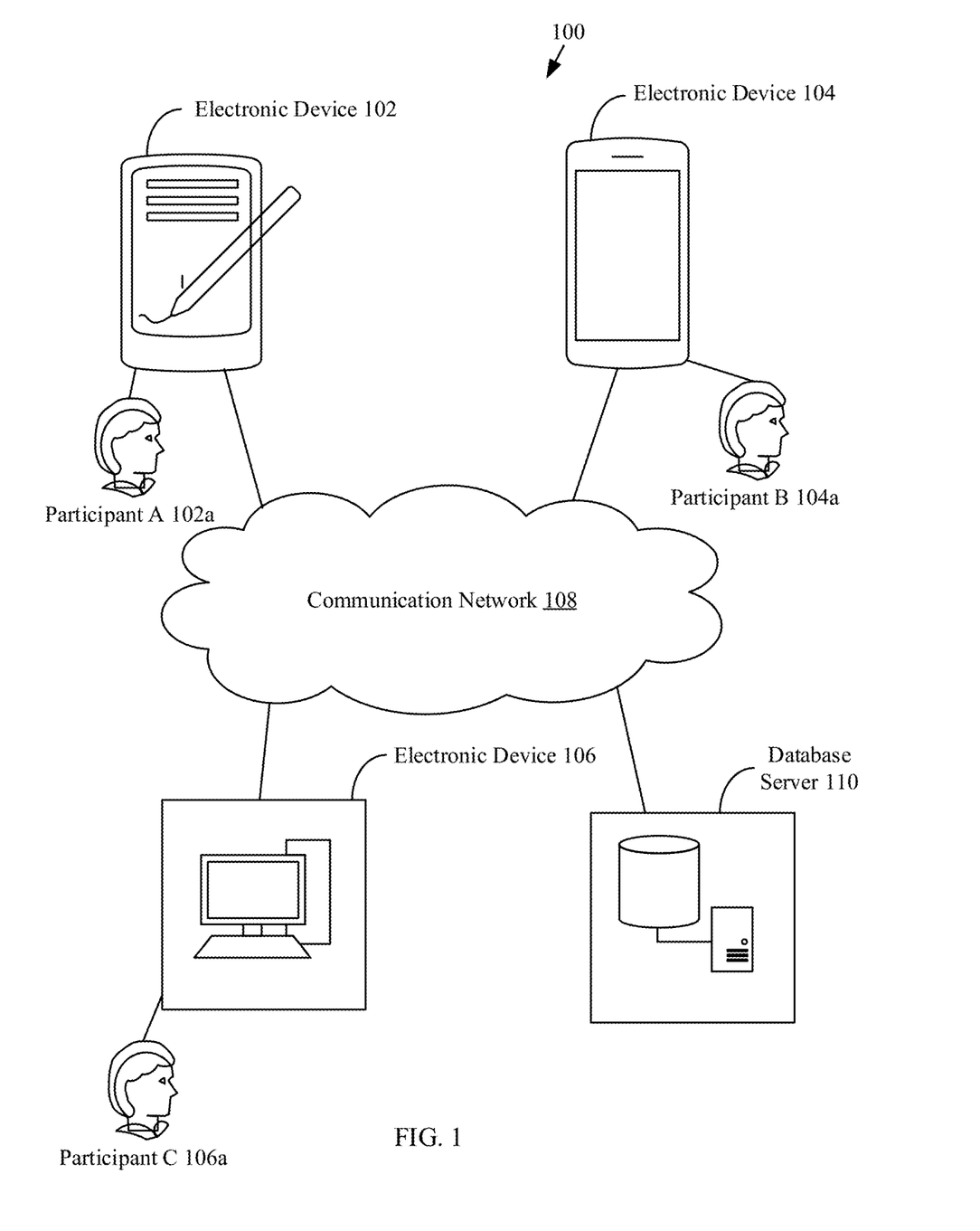
FIG. 1 is a block diagram that illustrates a system environment for updating an area allocated for displaying of video feed associated with a plurality of participants within an adaptive video layout based on a determined trigger event, in accordance with at least one exemplary embodiment of the disclosure.

FIG. 1 is a block diagram that illustrates a system environment 100 for updating an area allocated for displaying of video feed associated with a plurality of participants within an adaptive video layout based on a determined trigger event, in accordance with at least one exemplary embodiment of the disclosure. Referring to FIG. 1, the system environment 100 may include a plurality of electronic devices, such as 102, 104 and 106, which are associated with a plurality of participants, such as Participant A 102a, Participant B 104a, and Participant C 106a, a communication network 108, a database server 110, and a central server 112. Each of the plurality of electronic devices 102, 104, and 106 that are associated with the plurality of participants, such as Participant A 102a, Participant B 104a, and Participant C 106a, may be communicatively coupled with the database server 110, and the central server 112, via the communication network 108.

The plurality of electronic devices, such as electronic device 102, 104 and 106 may refer to a computing device used by a participant who has joined an online meeting to collaboratively work with a remaining plurality of participants. The plurality of electronic devices, such as electronic device 102, 104 and 106 may comprise of one or more processors and one or more memories. The one or more memories may include computer readable code that may be executable by the one or more processors to perform predetermined operations. In an exemplary embodiment, the plurality of electronic devices, such as electronic device 102, 104 and 106 may present a user-interface to the participant for performing one or more interactions on the electronic device. Examples of the plurality of electronic devices, such as electronic device 102, 104 and 106 may include, but are not limited to, a personal computer, a laptop, a personal digital assistant (PDA), a mobile device, a tablet, or any other computing device.

The plurality of participants, such as Participant A 102a, Participant B 104a, and Participant C 106a may be utilizing the electronic device 102, the electronic device 104 and the electronic device 106, respectively as shown in FIG. 1. The plurality of participants, such as Participant A 102a, Participant B 104a, and Participant C 106a may interact with the plurality of electronic devices, such as electronic device 102, 104 and 106 by performing one or more interactions on the user-interface presented to each of the respective participants of the associated electronic device.

In an exemplary embodiment, the communication network 108 may include a communication medium through which each of the plurality of electronic devices, such as 102, 104 and 106, the database server 110, and the central server 112 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an exemplary embodiment, the plurality of electronic devices, such as the electronic devices 102, 104 and 106 may include a database server 110. In an exemplary embodiment, the database server 110 may refer to a computing device that may be configured to store files associated with one or more applications installed on the electronic device. Further, the database server 110 may be configured to store information, such as, but not limited to, network information, meeting data associated with each of the plurality of participants, such as Participant A 102a, Participant B 104a, and Participant C 106a, and one or more topics being discussed during the video conference meeting.

In an exemplary embodiment, the plurality of electronic devices, such as electronic device 102, 104 and 106 may communicate with the database server 110 using one or more protocols such as, but not limited to, Open Database Connectivity (ODBC) protocol and Java Database Connectivity (JDBC) protocol. In an exemplary embodiment, the database server 110 may include a special purpose operating system specifically configured to perform one or more database operations on at least one of the meeting data, the one or more topics and the network information. Examples of database operations may include, but are not limited to, Select, Insert, Update, and Delete. In an exemplary embodiment, the database server 110 may include hardware that may be configured to perform one or more predetermined operations. In an exemplary embodiment, the database server 110 may be realized through various technologies such as, but not limited to, Microsoft® SQL Server, Oracle®, IBM DB2®, Microsoft Access®, PostgreSQL®, MySQL® and SQLite®, and the like.

A person having ordinary skill in the art will appreciate that the scope of the disclosure is not limited to realizing the plurality of electronic devices, such as electronic device 102, 104 and 106 and the database server 110 as separate entities. In an exemplary embodiment, the database server 110 may be realized as an application program installed on and/or running on the electronic device without departing from the scope of the disclosure.

In an exemplary embodiment, the central server 112 may refer to a computing device or a software framework hosting an application or a software service. In an embodiment, the central server 112 may be implemented to execute procedures such as, but not limited to, programs, routines, or scripts stored in one or more memories for supporting the hosted application or the software service. In an embodiment, the hosted application or the software service may be configured to perform one or more predetermined operations. The central server 112 may be realized through various types of application servers such as, but are not limited to, a Java application server, a .NET framework application server, a Base4 application server, a PHP framework application server, or any other application server framework.

The "video conference meeting" mentioned in the disclosure herein refers to an online meeting conducted via one or more video conferencing tools. The "video conference meeting" may involve the plurality of participants, such as Participant A 102a, Participant B 104a, and Participant C 106a interacting with each other and/or discussing one or more topics. In some examples, the video conference meeting may be organized face to face or on a virtual platform over the communication network 108. Meeting on the virtual platform may involve the plurality of participants, such as Participant A 102a, Participant B 104a, and Participant C 106a, joining a meeting session (created by the central server 112 in the communication network 108) using the respective plurality of electronic devices, such as 102, 104 and 106.

Further, each video conference meeting may have an associated meeting data that comprises agenda of the meeting, transcript of audio generated by each of the plurality of participants during the video conference meeting, transcript of content shared by the plurality of participants during the video conference meeting, and/or meeting notes inputted by the plurality of participants during the video conference meeting.

In an exemplary embodiment, the video conference meeting may be conducted on a video conferencing tool. Video conferencing tools may enable online communication for audio meetings, video meetings, and seminars between the plurality of participants, such as Participant A 102a, Participant B 104a, and Participant C 106a. The video conferencing tools may have one or more built-in features such as chat, screen sharing, recording, and the like. The video conferencing tools used for hosting the meeting may help to enhance collaboration within employees in an organization. The employees may host or attend virtual meetings with fellow employees, company partners, and/or customers. Examples of such video conferencing tools that may be utilized to conduct the meeting may include Skype®, Zoom®, Microsoft Teams®, Cisco Webex Meetings®, and the like.

In operation, before conducting the video conference meeting over the communication network 108 the central server 112 may be configured to create a meeting session. Prior to creation of the meeting session, the central server 112 may receive a request from an electronic device, such as 102 associated with a participant A 102a such as an organizer of the first meeting, to create the meeting session. Along with the request, the organizer of the video conference meeting (one of the participant, such as Participant A 102a) may define meeting joining information associated with the video conference meeting. Such meeting joining information associated with the video conference meeting may include at least an agenda of the video conference meeting, one or more topics to be discussed during the video conference meeting, a time duration of the video conference meeting, a schedule of the video conference meeting, meeting notes carried forwarded from previous meetings, and/or the like. After receiving the meeting joining information, the central server 112 may be configured to create the meeting session. Additionally, the central server 112 may share the meeting joining information with the plurality of participants, such as Participant A 102a, Participant B 104a, and Participant C 106a for initiating the video conference meeting.

The plurality of electronic devices, such as 102, 104 and 106 may enable the plurality of participants, such as Participant A 102a, Participant B 104a, and Participant C 106a to join and initiate the video conference meeting based on the received meeting joining information. Further, during the first meeting, the plurality of participants, such as Participant A 102a, Participant B 104a, and Participant C 106a, may speak or share their respective video feeds. Additionally, or alternatively, the plurality of participants, such as Participant A 102a, Participant B 104a, and Participant C 106a, may share other content amongst each other in order to facilitate the discussions in the video conference meeting. The other content may include, but is not limited to, presentation content, screen sharing content, file sharing content, and/or the like. In an exemplary embodiment, each of the plurality of electronic devices, such as 102, 104 and 106 may enable the plurality of participants, such as Participant A 102a, Participant B 104a, and Participant C 106a, to consume the content shared during video conference meeting.

After initiating the video conference meeting, during the meeting, the central server 112 may be configured to receive network information associated with each of the plurality of electronic devices, such as 102, 104 and 106 and meeting data associated with each of the plurality of participants, such as Participant A 102a, Participant B 104a, and Participant C 106a. Further, the central server 112 may be configured to selectively control display of video feed associated with each of the plurality of participants, such as Participant A 102a, Participant B 104a, and Participant C 106a, during the video conference meeting based on the network information and the meeting data. The central server 112 may be configured to create an adaptive video layout for each of the plurality of participants, such as Participant A 102a, Participant B 104a, and Participant C 106a. In an exemplary embodiment, the adaptive video layout may be represented in a grid format. In an exemplary embodiment, an area allocated for display of video feed associated with each of the plurality of participants, such as Participant A 102a, Participant B 104a, and Participant C 106a may be represented within the grid format.

Once the video feed is displayed in the adaptive video layout, then the central server 112 may be configured to determine a trigger event to update the area allocated for display of video feed associated with each of the plurality of participants, such as Participant A 102a, Participant B 104a, and Participant C 106a represented within the grid format. In an exemplary embodiment, the trigger event may comprise a speaking activity of the plurality of participants, such as Participant A 102a, Participant B 104a, and Participant C 106a during the video conference meeting and lexical usage corresponding to the speaking activity. Based on the determined trigger event, the central server 112 may be configured to update the area allocated for display of video feed associated with each of the plurality of participants, such as Participant A 102a, Participant B 104a, and Participant C 106a.

Further, the central server 112 may be configured to segment conversations between the plurality of participants, such as Participant A 102a, Participant B 104a, and Participant C 106a based on the lexical usage to identify one or more topics being discussed in the video conference meeting. The central server 112 may be configured to identify a set of participants conversing about a common topic from the identified one or more topics based on one or more machine learning models. Finally, the central server 112 may be configured to dynamically update the area allocated for display of video feed associated with the set of participants.

Figure 2:
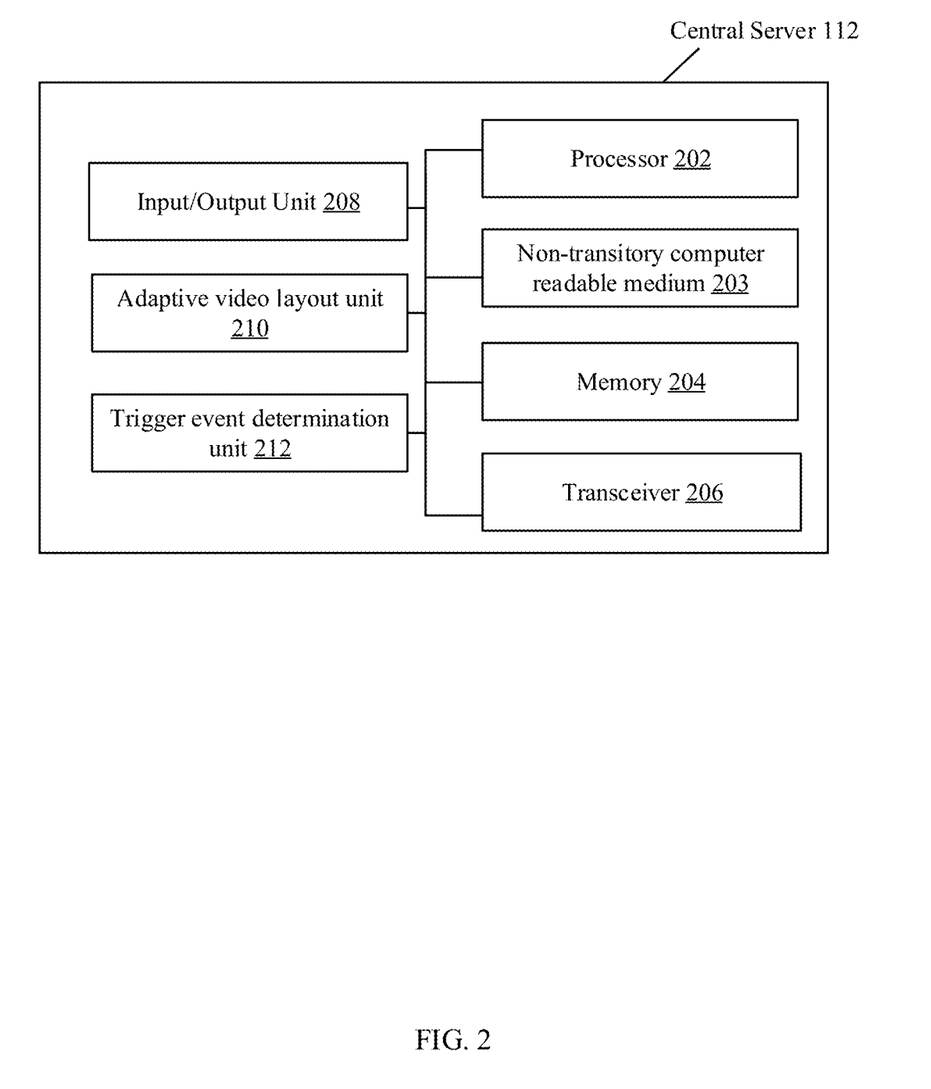
FIG. 2 is a block diagram that illustrates an central server configured to update an area allocated for displaying of video feed associated with a plurality of participants within an adaptive video layout based on a determined trigger event, in accordance with at least one exemplary embodiment of the disclosure.

FIG. 2 is a block diagram that illustrates an central server 112 configured to update an area allocated for displaying of video feed associated with a plurality of participants within an adaptive video layout based on a determined trigger event, in accordance with at least one exemplary embodiment of the disclosure.

FIG. 2 has been explained in conjunction with the elements of FIG. 1. Referring to FIG. 2, there is shown the central server 112, which may include a processor 202, a non-transitory computer readable medium 203, a memory 204, a transceiver 206, an input/output unit 208, an adaptive video layout unit 210, and a trigger event determination unit 212. The processor 202 may be communicatively coupled to the non-transitory computer readable medium 203, the memory 204, the transceiver 206, the input/output unit 208, the adaptive video layout unit 210, and the trigger event determination unit 212 and may operate in conjunction with each other to update the area allocated for display of video feed. Further, the transceiver 206 may be communicatively coupled to the communication network 108.

The processor 202 comprises suitable logic, circuitry, interfaces, and/or code that may be configured to execute a set of instructions stored in the memory 204. The processor 202 may be implemented based on several processor technologies known in the art. The processor 202 operates in coordination with the non-transitory computer readable medium 203, the transceiver 206, the input/output unit 208, the adaptive video layout unit 210, and the trigger event determination unit 212 to update the area allocated for display of video feed. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The non-transitory computer readable medium 203 may include any tangible or non-transitory storage media or memory media such as electronic, magnetic, or optical media—e.g., disk or CD/DVD-ROM coupled to processor 202.

The memory 204 comprises suitable logic, circuitry, interfaces, and/or code that may be configured to store the set of instructions, which are executed by the processor 202. In an exemplary embodiment, the memory 204 may be configured to store one or more programs, routines, or scripts that are executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that may be configured to receive the network information and the meeting data associated with each of the plurality of participants, such as Participant A 102a, Participant B 104a, and Participant C 106a from the plurality of electronic devices, such as electronic device 102, 104 and 106, via the communication network 108. The transceiver 206 may be further configured to transmit the updated area allocated for display of video feed to each of the plurality of electronic devices, such as electronic device 102, 104 and 106, via the communication network 108. The transceiver 206 may implement one or more known technologies to support wired or wireless communication with the communication network 108. In an exemplary embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The input/output unit 208 comprises suitable logic, circuitry, interfaces, and/or code that may be configured to display the video feed associated with each of the plurality of participants during the video conference meeting. The input/output unit 208 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. Further, the display screen may be configured to display the video feed associated with each of the plurality of participants during the video conference meeting.

The adaptive video layout unit 210 comprises suitable logic, circuitry, interfaces, and/or code that may be configured to selectively control display of video feed associated with each of the plurality of participants, such as Participant A 102a, Participant B 104a, and Participant C 106a during the video conference meeting based on the network information and the meeting data to create an adaptive video layout for each of the plurality of participants, such as Participant A 102a, Participant B 104a, and Participant C 106a. Further, the adaptive video layout unit 210 may be further configured to update the area allocated for display of video feed in adaptive video layout based on the determined trigger event. The adaptive video layout unit 210 may be further configured to dynamically mute one or more participants from the plurality of participants based on the meeting data and the speaking activity of the plurality of participants during the video conference meeting.

The trigger event determination unit 212 comprises suitable logic, circuitry, interfaces, and/or code that may be configured to determine a trigger event to update the area allocated for display of video feed associated with each of the plurality of participants, such as Participant A 102a, Participant B 104a, and Participant C 106a represented within the grid format. The trigger event determination unit 212 may be further configured to determine speaking activity of each of the plurality of participants, such as Participant A 102a, Participant B 104a, and Participant C 106a based on one or more machine learning models.

The trigger event determination unit 212 may be further configured to segment conversations between the plurality of participants, such as Participant A 102a, Participant B 104a, and Participant C 106a based on the lexical usage to identify one or more topics being discussed in the video conference meeting. The trigger event determination unit 212 may be further configured to identify a set of participants conversing about a common topic from the identified one or more topics based on the one or more machine learning models. The trigger event determination unit 212 may be further configured to dynamically update the area allocated for display of video feed associated with the set of participants.

In operation, the plurality of electronic devices, such as 102, 104 and 106 may enable the plurality of participants, such as Participant A 102a, Participant B 104a, and Participant C 106a to initiate and connect to the video conference meeting for working collaboratively and to discuss one or more topics during the video conference meeting. For instance, the Participant A 102a may be the host of the video conference meeting.

The transceiver 206 may be configured to receive the network information and the meeting data associated with each of the plurality of participants, such as Participant A 102a, Participant B 104a, and Participant C 106a. In an exemplary embodiment, the network information may include an average demanded bandwidth, average demanded bandwidth per type-of-service (ToS) traffic type, traffic volume per ToS traffic type, and/or drop count per ToS traffic type, latency, available bandwidth. In an exemplary embodiment, the meeting data may include an agenda of the meeting, a transcript of audio generated by the participant during the video conference meeting, a transcript of content shared by the participant during the video conference meeting, and/or meeting notes inputted by the participant during the video conference meeting.

For example, the below table A represents the network information received from the plurality of electronic devices, such as 102, 104 and 106 associated with the plurality of participants, such as Participant A 102a, Participant B 104a, and Participant C 106a.

TABLE A

| Network Parameter | Electronic device 102 | Electronic device 104 | Electronic device 106 |
|---|---|---|---|
| demanded bandwidth | 20 Mbps to 40 Mbps | 10 Mbps to 20 Mbps | 10 Mbps to 20 Mbps |
| age demanded bandwidth per type-of-service (ToS) traffic type | 0011 | 1011 | 1111 |
| drop count per ToS traffic type | 10 | 5 | 1 |
| latency | 20 milliseconds | 10 milliseconds | 5 milliseconds |
| available bandwidth | 10 Mbps | 12 Mbps | 25 Mbps |

In the above example, the 4-bit TOS is field is actually used to indicate throughput type, reliability type, delay type, and cost. For example, if the 4 bits of TOS has a value of 1111 (this might indicate low delay, high throughput, high reliability and minimized cost). Further, the plurality of electronic devices, such as 102, 104 and 106 demand a bandwidth of 20 Mbps to 40 Mbps, 10 Mbps to 20 Mbps, and 10 Mbps to 20 Mbps, respectively. Further, the drop count per ToS traffic type is 10.5 and 1 for the plurality of electronic devices, such as 102, 104 and 106, respectively. The latency for the plurality of electronic devices, such as 102, 104 and 106 is 20 milliseconds, 10 milliseconds, and 5 milliseconds, respectively. Additionally, the available bandwidth for the plurality of electronic devices, such as 102, 104 and 106 is 10 Mbps, 12 Mbps, and 25 Mbps, respectively.

Further, the agenda of the meeting may include:
Introduction of all participants—Participant A 102a
Decide new features to be included in the new release of the software—Participant B 104a and Participant C 106a
Decide software update release date—Participant C 106a
Check updates regarding hiring of candidates in the development team—Participant A 102a, Participant B 104a, and Participant C 106a After receiving the network information and meeting data, the adaptive video layout unit 210 may be configured to selectively control display of video feed associated with each of the plurality of participants, such as Participant A 102a, Participant B 104a, and Participant C 106a during the video conference meeting based on the network information and the meeting data to create an adaptive video layout for each of the plurality of participants, such as Participant A 102a, Participant B 104a, and Participant C 106a. In an exemplary embodiment, the adaptive video layout may be represented in a grid format. In an exemplary embodiment, an area may be allocated for display of video feed associated with each of the plurality of participants represented within the grid format. For example, the grid format may include 3 quadrants and the size/area of each quadrant may be different.

The adaptive video layout unit 210 may be configured to determine if a participant, such as Participant A 102a has predefined bandwidth to display the video feed associated with the participant. Continuing from the above example, the demanded bandwidth for Participant A 102a is 20 Mbps to 40 Mbps however, the available bandwidth is only 10 Mbps. Further, the adaptive video layout unit 210 may be configured to determine a time instant when the participant, such as Participant A 102a is going to initiate a discussion based on the meeting data. Based on the determined time instant the adaptive video layout unit 210 may provide a larger area for the video feed of the participant, such as Participant A 102a within the grid. For example, the Participant A 102a has less available bandwidth hence the adaptive video layout unit 210 may turn off the video feed of the Participant A 102a. However, at the time instant when the Participant A 102a initiates a discussion during the video conference meeting then at such time instant the adaptive video layout unit 210 may turn on the video feed of the Participant A 102a and may provide a larger area for the video feed of the participant, such as Participant A 102a within the grid. Thus, within the 3 quadrants, while Participant A 102a is conversing on a topic then the video feed of Participant A 102a may have a greater area as compared to that of Participant B 104a and Participant C 106a. Thus, the adaptive video layout unit 210 may be configured to identify a participant, such as Participant A 102a who is talking while the meeting is in progress and may provide a larger area for the video of the participant within the grid.

Once the video feed is displayed in the grid format of the adaptive video layout, then the trigger event determination unit 212 may be configured to continuously determine a trigger event to update the area allocated for display of video feed associated with each of the plurality of participants, such as Participant A 102a, Participant B 104a, and Participant C 106a represented within the grid format. In an exemplary embodiment, the trigger event may include a speaking activity of the plurality of participants during the video conference meeting and lexical usage corresponding to the speaking activity. In an exemplary embodiment, the speaking activity may be determined based on one or more machine learning models. In an exemplary embodiment, the one or more machine learning models may be trained to understand one or more time instants at which the speaking activity of the plurality of participants may be performed.

For example, the trigger event determination unit 212 may determine that at the start of the meeting Participant A 102a will be speaking based on the meeting agenda. Thus, the one or more machine learning models may monitor the lexical usage of the Participant A 102a to identify if the Participant A 102a has referenced to any other participant during the meeting. For example, the Participant A 102a may say "Let us now decide new features to be included in the new release of the software. Can Participant B 104a and Participant C 106a elaborate on the new features".

Thus, the one or more machine learning models may understand that after Participant A 102a stops speaking then Participant B 104a and Participant C 106a are expected to speak. Based on the determined trigger event, the adaptive video layout unit 210 may be configured to update the area allocated for display of video feed corresponding to the Participant B 104a and Participant C 106a. For example, at the time instant when Participant B 104a and Participant C 106a are expected to speak then the adaptive video layout unit 210 may be configured to allocate a higher area for display of the video feed associated with Participant B 104a and Participant C 106a and allocate a lower area for display of the video feed associated with the Participant A 102a. In an exemplary embodiment, Participant A 102a may be allocated an area of 2 cm×2 cm, whereas Participant B 104a and Participant C 106a may be allocated an area of 4 cm×4 cm.

Further, the trigger event determination unit 212 may be configured to segment conversations between the plurality of participants, such as Participant A 102a, Participant B 104a, and Participant C 106a based on the lexical usage to identify one or more topics being discussed in the video conference meeting. For example, Participant A 102a may introduce each of the plurality of participants at the start of the video conference meeting and then say, "We all need to discuss about hiring of candidates in the development team. What is the progress in this front? Also, we need to find technical training programs for the testing team," From the above example, the trigger event determination unit 212 may segment the conversations to identify topics, such as hiring, development team, training programs, testing team and the like. In response to Participant A 102a, the Participant B 104a may say "We have shortlisted 3 candidates for hiring in the development team". Further, the Participant C 106a may say "Out of the 3 shortlisted candidates one of them is a previous employee of our company". In an exemplary embodiment, trigger event determination unit 212 may combine Further, the one or more machine learning models may be trained to identify a set of participants, such as Participant A 102a, Participant B 104a and Participant C 106a conversing about a common topic (i.e. hiring of candidates in the development team) from the identified one or more topics. In an exemplary embodiment, trigger event determination unit 212 may combine highlights that belong to the common topic. In an exemplary embodiment, trigger event determination unit 212 may perform topic tilling using pre-trained transformer models and a score may be assigned to each of the one or more topics and then a set of topics may be selected from the one or more topics for generating the highlights based on the assigned score. The keywords & topics in conversations during the video conference meeting are critical for prioritizing highlights. In an exemplary embodiment, people references, names, organizations, dates, and the like may be used for topic identification and for creating highlights. If plurality of participants, such as Participant A 102a, Participant B 104a and Participant C 106a are conversing about a common topic then the area allocated for display of video of each of the plurality of participants may be the same. Thus, the area allocated for display of video feed associated with the set of participants may be dynamically updated during the video conference meeting based on the determined trigger event, the meeting data and the network information. Further, the trigger event determination unit 212 may compute a mean representation of utterances of each participant and then filter all utterances which are closer to the mean. Based on the computed mean representation the trigger event determination unit 212 may perform dialogue understanding.

In an exemplary embodiment, the adaptive video layout unit 210 may be configured to allocate a higher area for display of the video feed associated with a first participant, such as Participant C 106a from the plurality of participants and allocating a lower area for display of the video feed associated with a second participant, such as Participant A 102a from the plurality of participants in comparison with the first participant and the second participant. For example, the Participant A 102a may be allocated an area of 2 cm×2 cm whereas the Participant C 106a may be allocated an area of 4 cm×4 cm because the available bandwidth for Participant A 102a is less, the latency is higher, and the drop count per ToS traffic type is also high. In an exemplary embodiment, a host participant, such as Participant A 102a from the plurality of participants has a fixed video area within the adaptive video layout.

In an exemplary embodiment, the adaptive video layout unit 210 may be configured to detect that the host (Participant A 102a) may have given permissions to some other participants, such as Participant C 106a during the video conference meeting and then by correlating with the meeting agenda it may be understood that within the next few seconds the other participants, such as Participant C 106a may be the host or will present something important. In such a scenario the video of the other participants, such as Participant C 106a will be given more area in the adaptive video layout.

In an exemplary embodiment, the adaptive video layout unit 210 may be configured to dynamically mute one or more participants from the plurality of participants based on the meeting data and the speaking activity of the plurality of participants during the video conference meeting. For example, when the Participant A 102a is speaking then the other participants i.e. Participant B 104a and Participant C 106a may be kept on mute. However, automatically when the Participant B 104a is expected to speak then the Participant B 104a may be unmuted and Participant A 102a may be muted.

Further, the trigger event determination unit 212 may be configured to create one or more highlights of the video conference meeting based on the segmentation and topic identification. For example, after identifying top three of the five highlights in each speaker based segment then for a given top highlight starting at time t in the segment one or more highlights may be cheeked whose start time is in t−30 sec and all highlights whose end time fall in t+30 sec. Further, one or more identified highlights may be combined to create a meeting snippet. In an exemplary embodiment, the meeting snippet may correspond to a recording of a portion of the meeting. The meeting snippet may be captured for a determined duration. In the above example, if the topic transition happens in between the intervals t−30 sec and t+30 sec then such highlights may not be combined. Further, if a top highlight falls in the interval t−30 sec to t sec and t sec to t+30 sec then the meeting snippet is extended to 30 secs.

Figure 3:
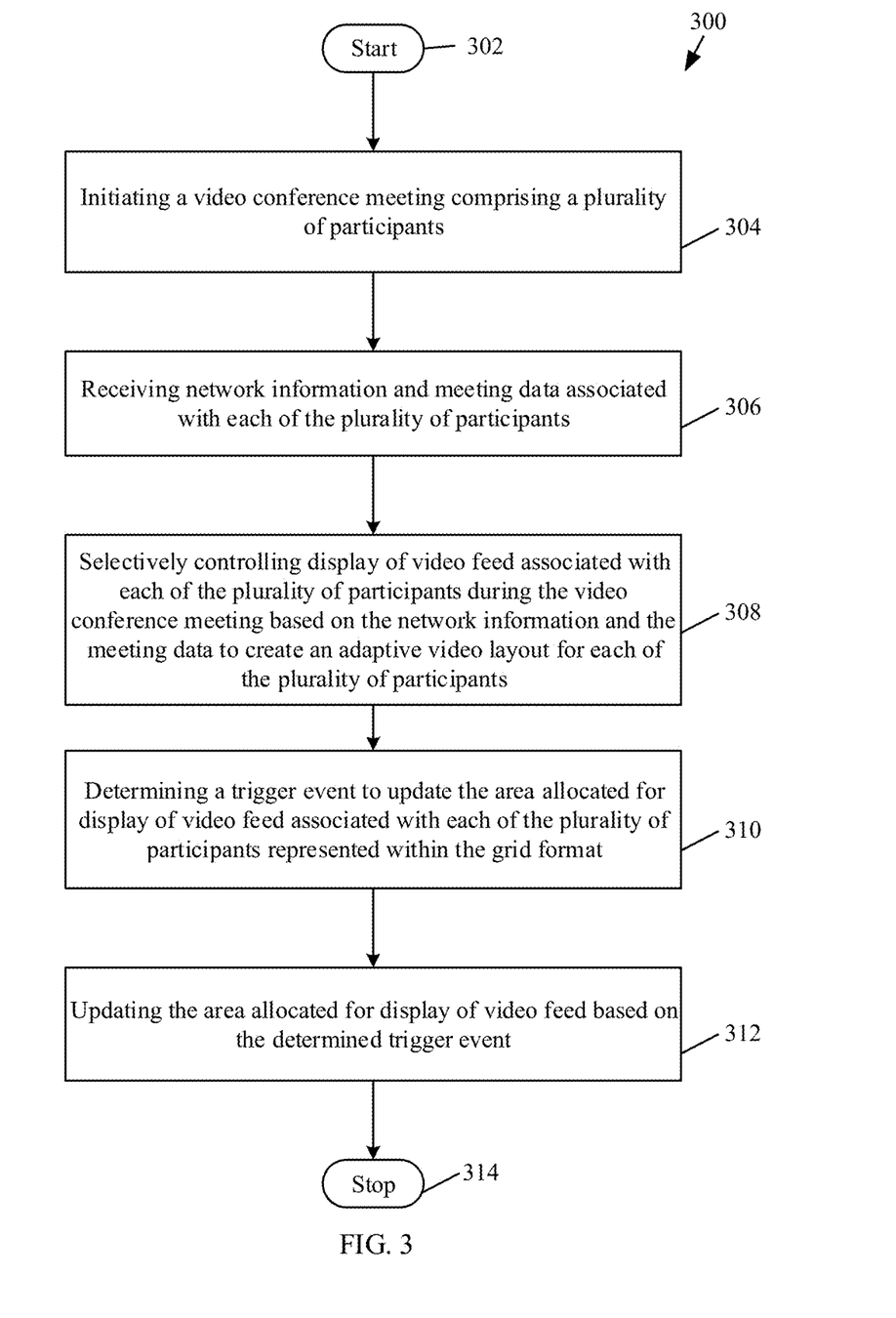
FIG. 3 is a flowchart that illustrates a method for updating an area allocated for displaying of video feed associated with a plurality of participants within an adaptive video layout based on a determined trigger event, in accordance with at least one exemplary embodiment of the disclosure.

FIG. 3 is a flowchart that illustrates a method 300 for updating an area allocated for displaying of video feed associated with a plurality of participants within an adaptive video layout based on a determined trigger event, in accordance with at least one exemplary embodiment of the disclosure.

Referring to FIG. 3, the method 300 starts at 302 and proceeds to 304. At 304, a central server 112 may be configured to initiate a video conference meeting comprising a plurality of participants. At 306, the central server 112 may be configured to receive network information and meeting data associated with each of the plurality of participants. At 308, the central server 112 may be configured to selectively control display of video feed associated with each of the plurality of participants during the video conference meeting based on the network information and the meeting data to create an adaptive video layout for each of the plurality of participants. At 310, the central server 112 may be configured to determine a trigger event to update the area allocated for display of video feed associated with each of the plurality of participants represented within the grid format. At 312, the central server 112 may be configured to update the area allocated for display of video feed based on the determined trigger event. Control passes to end operation 314.

Figure 4:
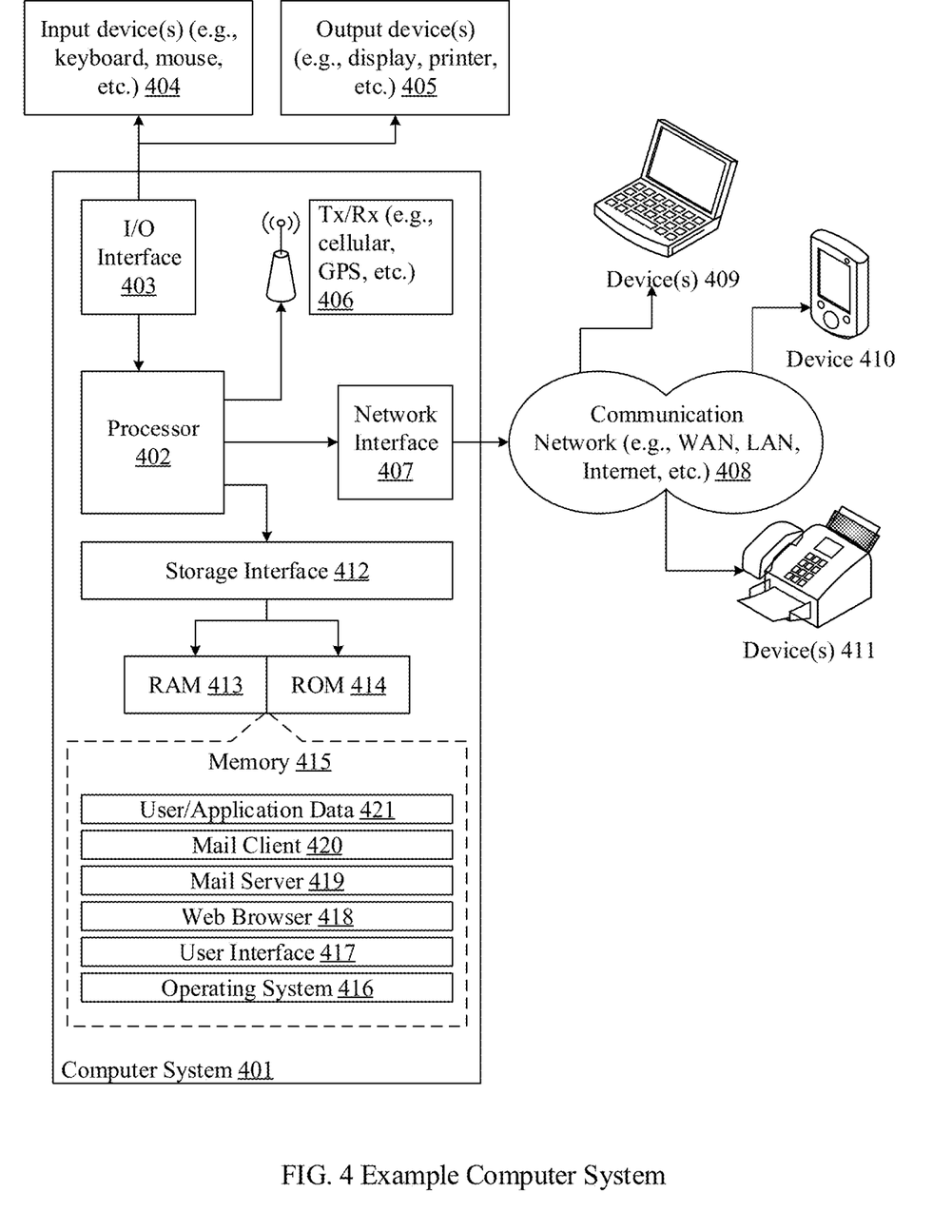
FIG. 4 is a block diagram of an exemplary computer system for updating an area allocated for displaying of video feed associated with a plurality of participants within an adaptive video layout based on a determined trigger event, in accordance with various exemplary embodiments of the present disclosure.

FIG. 4 is a block diagram of an exemplary computer system 401 for updating an area allocated for displaying of video feed associated with a plurality of participants within an adaptive video layout based on a determined trigger event, in accordance with various exemplary embodiments of the present disclosure.

Referring to FIG. 4, there is shown an exemplary computer system 401, which may comprise a central processing unit ("CPU" or "processor") 402, an I/O interface 403, an input device 404, an output device 405, a transceiver 406, a network interface 407, a communication network 408, devices, such as 409, 410 and 411, storage interface 412, one or more memory devices, such as RAM 413, ROM 414, and memory device 415.

Variations of computer system 401 may be used for generating and displaying the summary. The computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor 402 may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some exemplary embodiments may utilize embedded technologies like application-specific integrated circuits (ASICs), digital signal processors (DSPs), Field Programmable Gate Arrays (FPGAs), etc.

The processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

The computer system 401 may be configured to utilize the I/O interface 403 to communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some exemplary embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some exemplary embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, for example, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone®, Blackberry®, Android®-based phones, etc.), tablet computers, eBook readers (Amazon Kindle®, Nook, etc.), laptop computers, notebooks, gaming consoles (Microsoft Xbox®, Nintendo DS®, Sony PlayStation®, etc.), or the like. In some exemplary embodiments, the computer system 401 may itself embody one or more of these devices.

In some exemplary embodiments, the processor 402 may be communicatively coupled with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some exemplary embodiments, the computer system 401 may implement a web browser 1118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some exemplary embodiments, the computer system 401 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some exemplary embodiments, the computer system 401 may implement a mail client 420 stored program component. The mail client may be a mail viewing application, such as Apple Mail, Microsoft Entourage, Microsoft Outlook, Mozilla Thunderbird, etc.

In some exemplary embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the computer or database component may be combined, consolidated, or distributed in any working combination.

Furthermore, one or more computer-readable storage media may be utilized to implement various exemplary embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the exemplary embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Various exemplary embodiments of the disclosure encompass numerous advantages including methods and systems for updating the area allocated for display of video feed of plurality of participants based on the determined trigger event. In an exemplary embodiment, the methods and systems provide a dynamic video layout for display of video feed during a video conference meeting. The disclosed method and system ensures that based on the network information and the meeting data the video layout is dynamically updated. The dynamic video layout ensures optimal usage of available network and at the same time ensures that all the participants video feed is displayed at the correct time. The machine learning models disclosed herein efficiently capture speaking activity of the plurality of participants during the video conference meeting and lexical usage corresponding to the speaking activity, which is further used to accurately, and dynamically update the area allocated for display of video feed of the plurality of participants. Disclosed methods and systems effectively monitor and track in real time the meeting data and the network information and accordingly accurately update the area allocated for display of video feed of the plurality of participants.

Thus, the claimed operations as discussed above are not routine, conventional, or well understood in the art, as the claimed operation enable the following solutions to the existing problems in conventional technologies.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned operations and/or system modules may be suitably replaced, reordered, or removed, and additional operations and/or system modules may be inserted, depending on the needs of a particular application. In addition, the systems of the aforementioned exemplary embodiments may be implemented using a wide variety of suitable processes and system modules, and are not limited to any particular computer hardware, software, middleware, firmware, microcode, and the like. The claims can encompass exemplary embodiments for hardware and software, or a combination thereof.

While the present disclosure has been described with reference to certain exemplary embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular exemplary embodiment disclosed, but that the present disclosure will include all exemplary embodiments falling within the scope of the appended claims.

What is claimed is:

1. A method, comprising:
   initiating, by a central server comprising a processor, a video conference meeting comprising a plurality of participants;
   receiving, by the central server, network information and meeting data associated with each of the plurality of participants;
   selectively controlling, by the central server, display of video feed associated with each of the plurality of participants during the video conference meeting based on the network information and the meeting data to create an adaptive video layout for each of the plurality of participants, wherein the adaptive video layout is represented in a grid format, and wherein an area is allocated for display of video feed associated with each of the plurality of participants represented within the grid format;
   segmenting conversations between the plurality of participants based on lexical usage;
   identifying based on the segmented conversations, one or more topics being discussed in the video conference meeting;
   determining, by the central server, a trigger event to update the area allocated for display of video feed associated with each of the plurality of participants represented within the grid format, wherein the trigger event comprises a speaking activity of the plurality of participants during the video conference meeting and the lexical usage corresponding to the speaking activity; and
   updating, by the central server, the area allocated for display of video feed based on the determined trigger event and the identified one or more topics.

2. The method of claim 1, wherein the speaking activity is determined based on one or more machine learning models, and wherein the one or more machine learning models are trained to understand one or more time instants at which the speaking activity of the plurality of participants is performed.

3. The method of claim 1, further comprising allocating a higher area for display of the video feed associated with a first participant from the plurality of participants and allocating a lower area for display of the video feed associated with a second participant from the plurality of participants in comparison with the first participant and the second participant.

4. The method of claim 1, further comprising:
   identifying a set of participants conversing about a common topic from the identified one or more topics based on one or more machine learning models; and
   dynamically updating the area allocated for display of video feed associated with the set of participants.

5. The method of claim 1, wherein a host participant from the plurality of participants has a fixed video area within the adaptive video layout.

6. The method of claim 1, wherein the network information comprises an average demanded bandwidth, average demanded bandwidth per type-of-service (ToS) traffic type, traffic volume per ToS traffic type, and/or drop count per ToS traffic type, latency, available bandwidth.

7. The method of claim 1, wherein the meeting data comprises agenda of the meeting, transcript of audio generated by the participant during the video conference meeting, transcript of content shared by the participant during the video conference meeting, and/or meeting notes inputted by the participant during the video conference meeting.

8. The method of claim 1, wherein selectively controlling display of video associated with each of the plurality of participants comprises:
   determining if a participant has predefined bandwidth to display the video associated with the participant;
   determining a time instant when the participant is going to initiate a discussion based on the meeting data and providing a larger area for the video of the participant within the grid format who is going to initiate the discussion; and
   determining whether to turn on or turn off the video feed of the participant based on the meeting data and the network information.

9. The method of claim 1, wherein selectively controlling display of video associated with each of the plurality of participants comprises:
   identifying a participant who is talking while the meeting is in progress and providing a larger area for the video of the participant within the grid format who is talking while the meeting is in progress.

10. The method of claim 1, further comprising dynamically muting one or more participants from the plurality of participants based on the meeting data and the speaking activity of the plurality of participants during the video conference meeting.

11. A central server, comprising:
    a hardware processor; and
    a memory communicatively coupled to the hardware processor, wherein the memory stores processor instructions, which, on execution, causes the hardware processor to:
    initiate a video conference meeting comprising a plurality of participants;
    receive network information and meeting data associated with each of the plurality of participants;
    selectively control display of video feed associated with each of the plurality of participants during the video conference meeting based on the network information and the meeting data to create an adaptive video layout for each of the plurality of participants, wherein the adaptive video layout is represented in a grid format, and wherein an area is allocated for display of video feed associated with each of the plurality of participants represented within the grid format;
    segment conversations between the plurality of participants based on lexical usage;
    identify based on the segmented conversations, one or more topics being discussed in the video conference meeting;
    determine a trigger event to update the area allocated for display of video feed associated with each of the plurality of participants represented within the grid format, wherein the trigger event comprises a speaking activity of the plurality of participants during the video conference meeting and the lexical usage corresponding to the speaking activity; and update the area allocated for display of video feed based on the determined trigger event and identified one or more topics.

12. The central server of claim 11, wherein the hardware processor is further configured to determine the speaking activity based on one or more machine learning models, and wherein the one or more machine learning models are trained to understand one or more time instants at which the speaking activity of the plurality of participants is performed.

13. The central server of claim 11, wherein the hardware processor is further configured to allocate a higher area for display of the video feed associated with a first participant from the plurality of participants and allocate a lower area for display of the video feed associated with a second participant from the plurality of participants in comparison with the first participant and the second participant.

14. The central server of claim 11, wherein the hardware processor is further configured to:
   identify a set of participants conversing about a common topic from the identified one or more topics based on one or more machine learning models; and
   dynamically update the area allocated for display of video feed associated with the set of participants.

15. The central server of claim 11, wherein a host participant from the plurality of participants has a fixed video area within the adaptive video layout.

16. The central server of claim 11, wherein the network information comprises an average demanded bandwidth, average demanded bandwidth per type-of-service (ToS) traffic type, traffic volume per ToS traffic type, and/or drop count per ToS traffic type, latency, available bandwidth.

17. The central server of claim 11, wherein the meeting data comprises agenda of the meeting, transcript of audio generated by the participant during the video conference meeting, transcript of content shared by the participant during the video conference meeting, and/or meeting notes inputted by the participant during the video conference meeting.

18. The central server of claim 11, wherein selectively controlling display of video associated with each of the plurality of participants comprises:
   determining if a participant has predefined bandwidth to display the video associated with the participant;
   determining a time instant when the participant is going to initiate a discussion based on the meeting data and providing a larger area for the video of the participant within the grid format who is going to initiate the discussion; and
   determining whether to turn on or turn off the video feed of the participant based on the meeting data and the network information.

19. The central server of claim 11, wherein selectively controlling display of video associated with each of the plurality of participants comprises:
   identifying a participant who is talking while the meeting is in progress and providing a larger area for the video of the participant within the grid format who is talking while the meeting is in progress.

20. The central server of claim 11, wherein the hardware processor is further configured to dynamically mute one or more participants from the plurality of participants based on the meeting data and the speaking activity of the plurality of participants during the video conference meeting.

21. A non-transitory computer readable medium having stored thereon, computer executable instructions, which when executed by at least one hardware processor in an electronic device, causes the electronic device to perform operations, the operations comprising:

initiating a video conference meeting comprising a plurality of participants;

receiving network information and meeting data associated with each of the plurality of participants;

selectively controlling display of video feed associated with each of the plurality of participants during the video conference meeting based on the network information and the meeting data to create an adaptive video layout for each of the plurality of participants, wherein the adaptive video layout is represented in a grid format, and wherein an area is allocated for display of video feed associated with each of the plurality of participants represented within the grid format;

segmenting conversations between the plurality of participants based on lexical usage;

identifying based on the segmented conversations, one or more topics being discussed in the video conference meeting;

determining a trigger event to update the area allocated for display of video feed associated with each of the plurality of participants represented within the grid format, wherein the trigger event comprises a speaking activity of the plurality of participants during the video conference meeting and the lexical usage corresponding to the speaking activity; and updating the area allocated for display of video feed based on the determined trigger event and the identified one or more topics.

22. A method, comprising:

initiating, by a central server comprising a processor, a video conference meeting comprising a plurality of participants;

receiving, by the central server, network information and meeting data associated with each of the plurality of participants;

selectively controlling, by the central server, display of video feed associated with each of the plurality of participants during the video conference meeting based on the network information and the meeting data to create an adaptive video layout for each of the plurality of participants, wherein the adaptive video layout is represented in a grid format, and wherein an area is allocated for display of video feed associated with each of the plurality of participants represented within the grid format;

determining, by the central server, a trigger event to update the area allocated for display of video feed associated with each of the plurality of participants represented within the grid format, wherein the trigger event comprises a speaking activity of the plurality of participants during the video conference meeting and lexical usage corresponding to the speaking activity; and updating, by the central server, the area allocated for display of video feed based on the determined trigger event, wherein selectively controlling display of video associated with each of the plurality of participants comprises:
  determining if a participant has predefined bandwidth to display the video associated with the participant;
  determining a time instant when the participant is going to initiate a discussion based on the meeting data and providing a larger area for the video of the participant within the grid format who is going to initiate the discussion; and
  determining whether to turn on or turn off the video feed of the participant based on the meeting data and the network information.

* * * * *